(12) United States Patent
Geissler et al.

(10) Patent No.: US 7,844,703 B2
(45) Date of Patent: Nov. 30, 2010

(54) SYSTEM AND METHOD OF MEASUREMENT FOR A DISTRIBUTED COMPUTER SYSTEM

(75) Inventors: Andrew Geissler, Austin, TX (US); Malcolm S. Ware, Austin, TX (US); Hye-Young McCreary, Liberty Hill, TX (US); Andreas Bieswanger, Ehningen (DE)

(73) Assignee: International Business Machines Corporation, Armonk, NY (US)

( * ) Notice: Subject to any disclaimer, the term of this patent is extended or adjusted under 35 U.S.C. 154(b) by 722 days.

(21) Appl. No.: 11/555,830

(22) Filed: Nov. 2, 2006

(65) Prior Publication Data

US 2008/0107218 A1    May 8, 2008

(51) Int. Cl.
*G06F 1/12*  (2006.01)
(52) U.S. Cl. ............... 709/224; 713/400; 713/500
(58) Field of Classification Search ............ 709/223, 709/248; 713/322, 400, 500
See application file for complete search history.

(56) References Cited

U.S. PATENT DOCUMENTS

| | | | |
|---|---|---|---|
| 4,255,707 A | 3/1981 | Miller | |
| 4,549,274 A | 10/1985 | Lerner et al. | |
| 4,642,564 A | 2/1987 | Hurley | |
| 4,745,392 A | 5/1988 | Ise et al. | |
| 4,752,697 A | 6/1988 | Lyons et al. | |
| 5,301,122 A | 4/1994 | Halpern | |
| 5,537,026 A | 7/1996 | Estes et al. | |
| 5,808,902 A | 9/1998 | Levert et al. | |
| 6,453,359 B1 | 9/2002 | Bender et al. | 709/248 |
| 6,792,337 B2 * | 9/2004 | Blackett et al. | 700/295 |
| 7,054,769 B2 | 5/2006 | Cox | |
| 7,062,668 B2 | 6/2006 | Kwahk et al. | |
| 7,072,813 B2 * | 7/2006 | Billemaz et al. | 703/6 |
| 7,356,665 B2 * | 4/2008 | Rawson, III | 711/202 |
| 2001/0012984 A1 * | 8/2001 | Adamiak et al. | 702/58 |
| 2003/0020455 A1 * | 1/2003 | Longini | 324/142 |
| 2004/0128091 A1 * | 7/2004 | Delin et al. | 702/75 |
| 2005/0187752 A1 * | 8/2005 | Colby et al. | 703/19 |
| 2006/0182214 A1 * | 8/2006 | Hwang et al. | 375/359 |
| 2008/0065912 A1 * | 3/2008 | Bodner et al. | 713/300 |
| 2008/0065924 A1 * | 3/2008 | Frodsham et al. | 713/400 |
| 2008/0291891 A1 * | 11/2008 | Jerlhagen et al. | 370/350 |
| 2009/0119437 A1 * | 5/2009 | Hilscher | 710/305 |

* cited by examiner

*Primary Examiner*—Thomas Lee
*Assistant Examiner*—Zahid Choudhury
(74) *Attorney, Agent, or Firm*—Diana R. Gerhardt; Van Leeuwen & Van Leeuwen

(57) ABSTRACT

A system and method of parameter measurement for a distributed computer system, the method including selecting a master unit; selecting slave units operably connected to the master unit on a bus, the slave units having a slave clock; determining slave unit latencies between the master unit and the slave units; generating slave unit synchronizing signals for the slave units, the slave unit synchronizing signals being adjusted for the slave unit latencies; synchronizing the slave clocks in response to the slave unit synchronizing signals; and measuring an operating parameter at the slave units at a synchronously determined time.

14 Claims, 4 Drawing Sheets

SYSTEM AND METHOD OF MEASUREMENT FOR A DISTRIBUTED COMPUTER SYSTEM

TECHNICAL FIELD

The technical field of this disclosure is parameter measurement in computer systems, particularly, parameter measurement in distributed computer systems.

BACKGROUND OF THE INVENTION

Distributed computer systems, such as high end symmetric multiprocessing (SMP) server systems, need to measure operating parameters throughout the computer system to monitor operation and obtain data for control operations. One example of an operating parameter that is measured is power, the measurement of which has become increasingly important both in reducing power usage and in controlling power flow throughout the computer system. The range of use for the measured power data extends from the simple passing of the data to an external program to the complex changing of the power performance state of the computer system based on the data. In low end computer systems, hardware is added to measure power usage before the power distribution system branches out, providing total power measurement but requiring extra hardware at additional expense. In high end computer systems, total power is not measured directly but is estimated, resulting in large errors. Errors require that additional margin be built into control calculations and that power systems be made larger to account for the error. Both of these add to the cost of computer systems in initial cost and during operation.

High end SMP server systems typically include a number of distributed points providing power measurements. These distributed points measure power consumed by server entities such as processor cores, memory units, and/or input/output devices. The SMP server system makes system level decisions based on the power measurements at the distributed points. Unfortunately, present SMP server systems take the power measurements at different times, making it impossible to accurately determine power at a particular point at a particular time or total power at a particular time.

FIGS. 1A and 1B illustrate the problem with taking power measurements at different times. FIG. 1A is a graph of actual power versus time for a distributed computer system. The actual power (labeled as Stave 1, Slave 2, Slave 3) at several slave points within the distributed computer system is summed to provide the actual total system power (labeled as System). FIG. 1B is a graph of indicated power versus time for a distributed computer system. The indicated powers (labeled as Slave 1, Slave 2, Slave 3) at several slave points within the distributed computer system are summed to provide the indicated total system power (labeled as System), which would be seen by a master device. In this illustration, the indicated power is shifted from the actual power for the slaves to reflect differences in slave unit latency between the master device and the slaves. Slave 3 is unshifted, Slave 2 is shifted two time units later, and Slave 1 is shifted four time units later. Data that occurred before real time zero, which does not appear on FIG. 1A, fills the first two time units of Slave 2 and the first four time units of Slave 1 on FIG. 1B. The earlier data decreases the magnitude of the indicated total system power of FIG. 1B relative to the actual total system power of FIG. 1A between zero and four time units in FIG. 1B.

The effect of the shifting is apparent from comparing the actual total system power of FIG. 1A to the indicated total system power of FIG. 1B. For example, the actual total system power increases steeply from zero to four time units, and then levels off. The indicated total system power shows a more gradual increase between one and eight time units, peaks at eight time units, then immediately declines. Any attempt to control system power based on the indicated total system power results in operational errors since the indicated total system power does not reflect the actual total system power.

It would be desirable to have a system and method of measurement for a distributed computer system that would overcome the above disadvantages.

SUMMARY OF THE INVENTION

The system and method of measurement for a distributed computer system of the present invention provides synchronous measurement of system parameters. Slave clocks in slave units are synchronized by allowing for slave unit latency between a master unit and the slave units. The precise measurement permits precise control of the distributed computer system and reduction of overly conservative operating margins.

One aspect of the present invention provides a method of parameter measurement for a distributed computer system including selecting a master unit; selecting slave units operably connected to the master unit on a bus, the slave units having slave clocks; determining slave unit latencies between the master unit and the slave units; generating slave unit synchronizing signals for the slave units, the slave unit synchronizing signals being adjusted for the slave unit latencies; synchronizing the slave clocks in response to the slave unit synchronizing signals; and measuring an operating parameter at the slave units at a synchronously determined time.

Another aspect of the present invention provides a computer program product in a computer usable medium for parameter measurement for a distributed computer system, the distributed computer system having a master unit and slave units operably connected to the master unit on a bus, with the slave units having slave clocks, the computer program product including computer program code for determining slave unit latencies between the master unit and the slave units; computer program code for generating slave unit synchronizing signals for the slave units, the slave unit synchronizing signals being adjusted for the slave unit latencies; computer program code for synchronizing the slave clocks in response to the slave unit synchronizing signals; and computer program code for measuring an operating parameter at the slave units at a synchronously determined time.

Another aspect of the present invention provides an information handling system including a processor; a master unit; slave units operably connected to the master unit on a bus, the slave units having slave clocks; a memory coupled to said processor to store instructions executable by a digital processing apparatus to perform operations to provide parameter measurement for a distributed computer system. The operations include determining slave unit latencies between the master unit and the slave units; generating slave unit synchronizing signals for the slave units, the slave unit synchronizing signals being adjusted for the slave unit latencies; synchronizing the slave clocks in response to the slave unit synchronizing signals; and measuring an operating parameter at the slave units at a synchronously determined time.

Another aspect of the present invention provides a method of power measurement for a distributed computer system including selecting a master unit; selecting slave units operably connected to the master unit on a bus, the slave units having slave clocks; determining slave unit latencies between the master unit and the slave units; determining slave unit synchronizing signals for the slave units, the slave unit synchronizing signals being adjusted for the slave unit latencies; synchronizing the slave clocks in response to the slave unit synchronizing signals; and measuring power at the slave units at a synchronously determined time.

The foregoing and other features and advantages of the invention will become further apparent from the following detailed description of the presently preferred embodiments, read in conjunction with the accompanying drawings. The detailed description and drawings are merely illustrative of the invention, rather than limiting the scope of the invention being defined by the appended claims and equivalents thereof.

DETAILED DESCRIPTION OF PREFERRED EMBODIMENTS

Figure 1A:
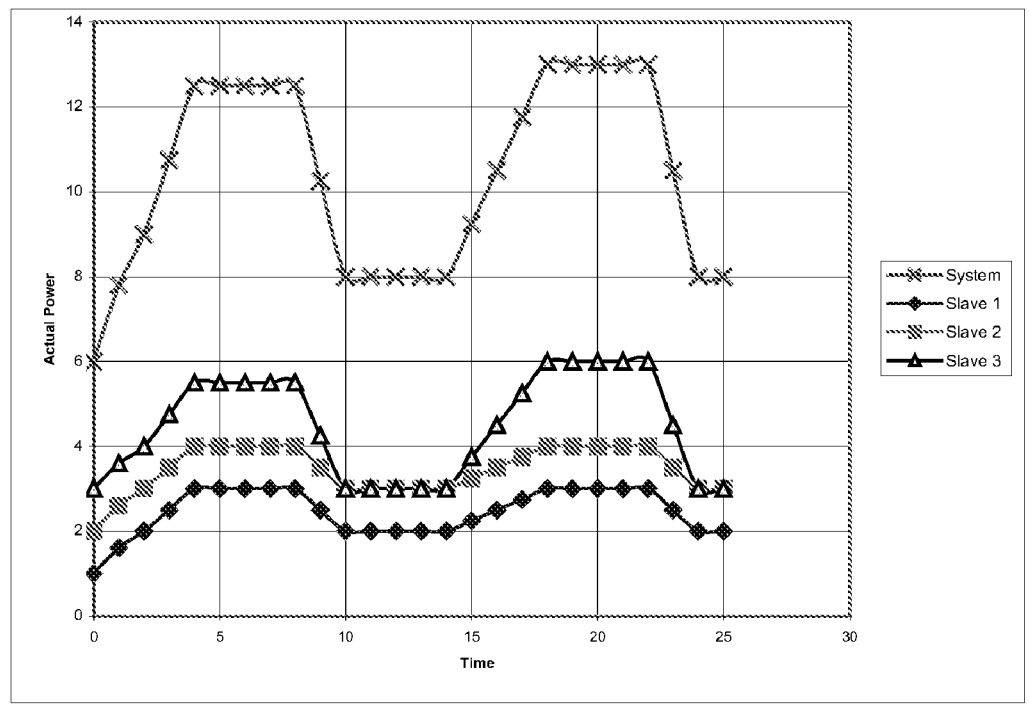
FIG. 1A is a graph of actual power versus time for a distributed computer system.
Figure 1B:
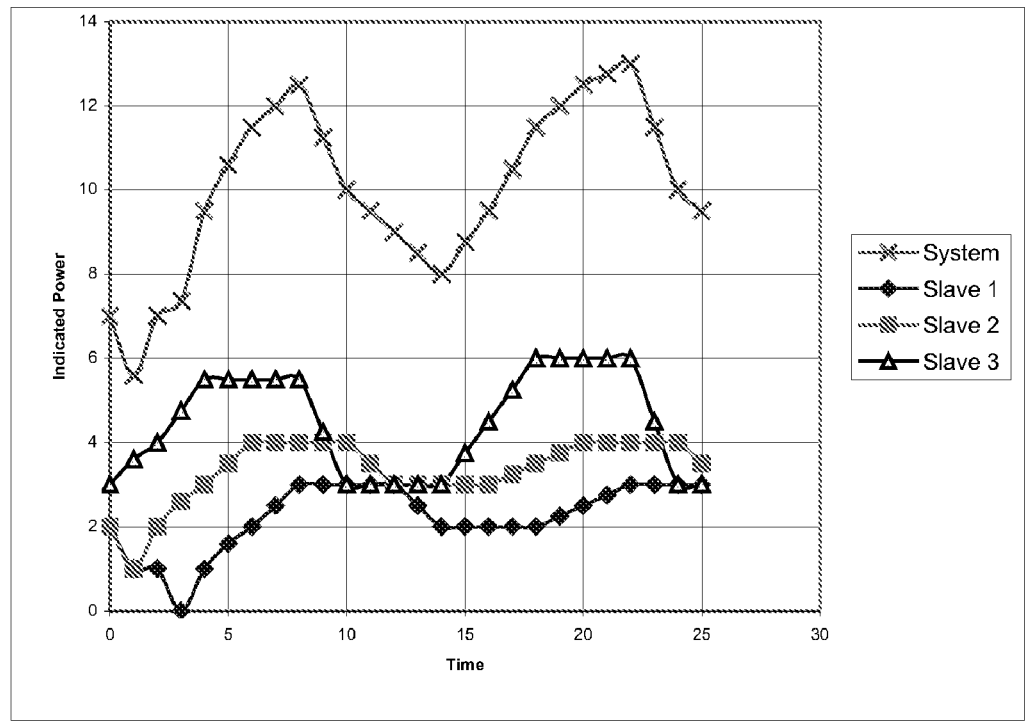
FIG. 1B is a graph of indicated power versus time for a distributed computer system.
Figure 2:
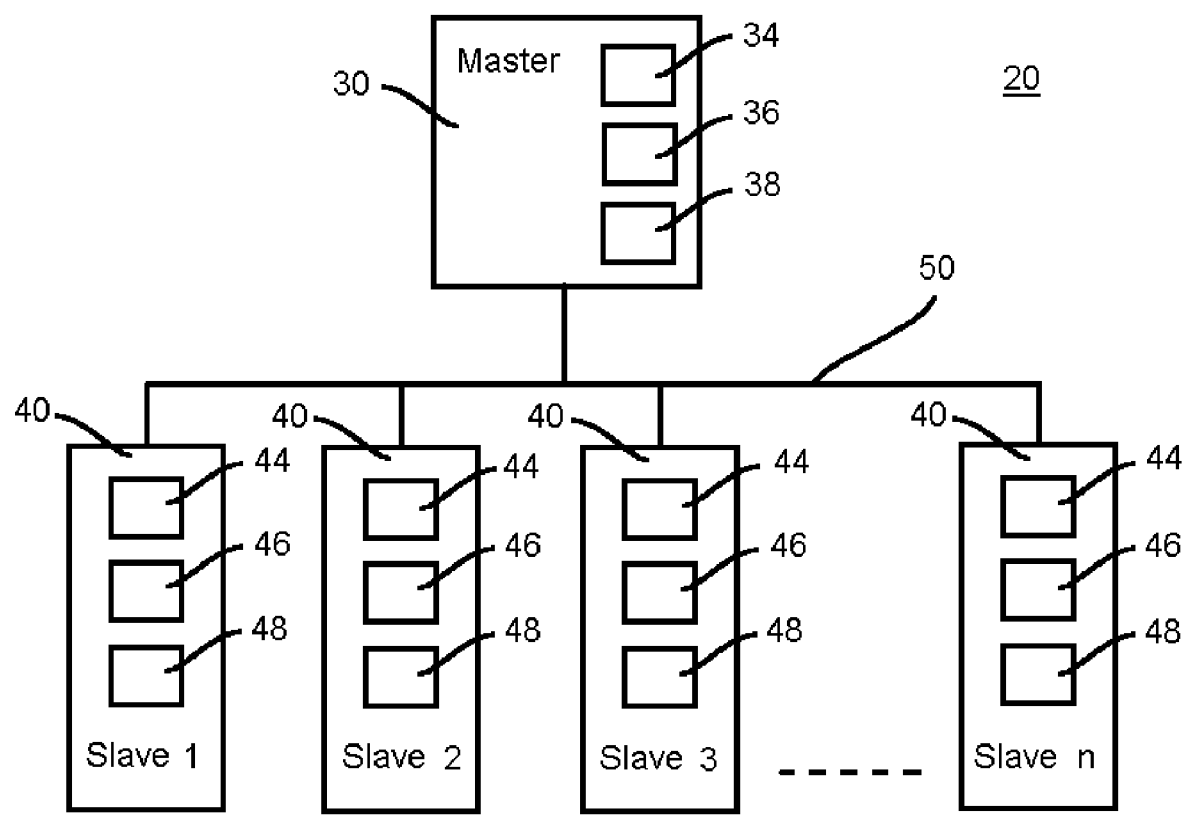
FIG. 2 is a block diagram of a distributed computer system applying a method of parameter measurement performed in accordance with the present invention.

FIG. 2 is a block diagram of a distributed computer system applying a method of parameter measurement performed in accordance with the present invention. In this example, a distributed computer system 20 includes a master unit 30 operably connected to a number of slave units 40 by a bus 50. The individual slave units 40 can also be operably connected to each other by the bus 50. Because the master unit 30 is connected to the slave units 40 over a single bus 50, the master unit 30 can only communicate with one of the slave units 40 at a time. The master unit 30 has a master unit processor 34, which executes instructions, and master unit storage 36, which stores instructions and/or data, and a master clock 38. The slave units 40 have slave unit processors 44, which execute instructions; slave unit storage 46, which store instructions and/or data; and slave clocks 48. In one example, the distributed computer system 20 includes forty-two slave units to be read by the master unit.

In one embodiment, the distributed computer system 20 is a high end SMP server system and the master unit 30 is an SMP server. The slave units 40 can be server entities, such as processor cores, memory units, and/or input/output devices, which include small microcontrollers capable of measuring an operating parameter at the individual slave unit 40. Examples of operating parameters include power, temperature, or any other operating parameter that can be determined at the individual slave unit 40. In one embodiment, the operating parameter is measured directly with a sensor (not shown) operably connected to the individual slave unit 40. In another embodiment, the operating parameter is measured indirectly by measuring activity indicative of the operating parameter, such as data flow, within the individual slave unit 40. The bus 50 can be an I$^2$C (Intelligent Interface Controller) bus with signals on I$^2$C bus conforming to the I$^2$C protocol developed by Philips Semiconductor. An I$^2$C bus uses two wires, a serial data wire and a serial clock wire, to carry information between devices connected to the wires. A unique address is provided for the master unit 30 and the slave units 40. The master unit 30 sends instructions to and receives data from the slave units 40. Those skilled in the art will appreciate that the distributed computer system 20 is not limited to the configuration described and can be any distributed computer system with distributed units communicating over a bus. For example, the bus 50 can be any bus suitable for the communication protocol desired, such as a standard serial interface (RS232), Ethernet (transmission control protocol/internet protocol [TCP/IP], user datagram protocol [UDP]), peripheral component interconnect (PCI), or the like.

Figure 3:
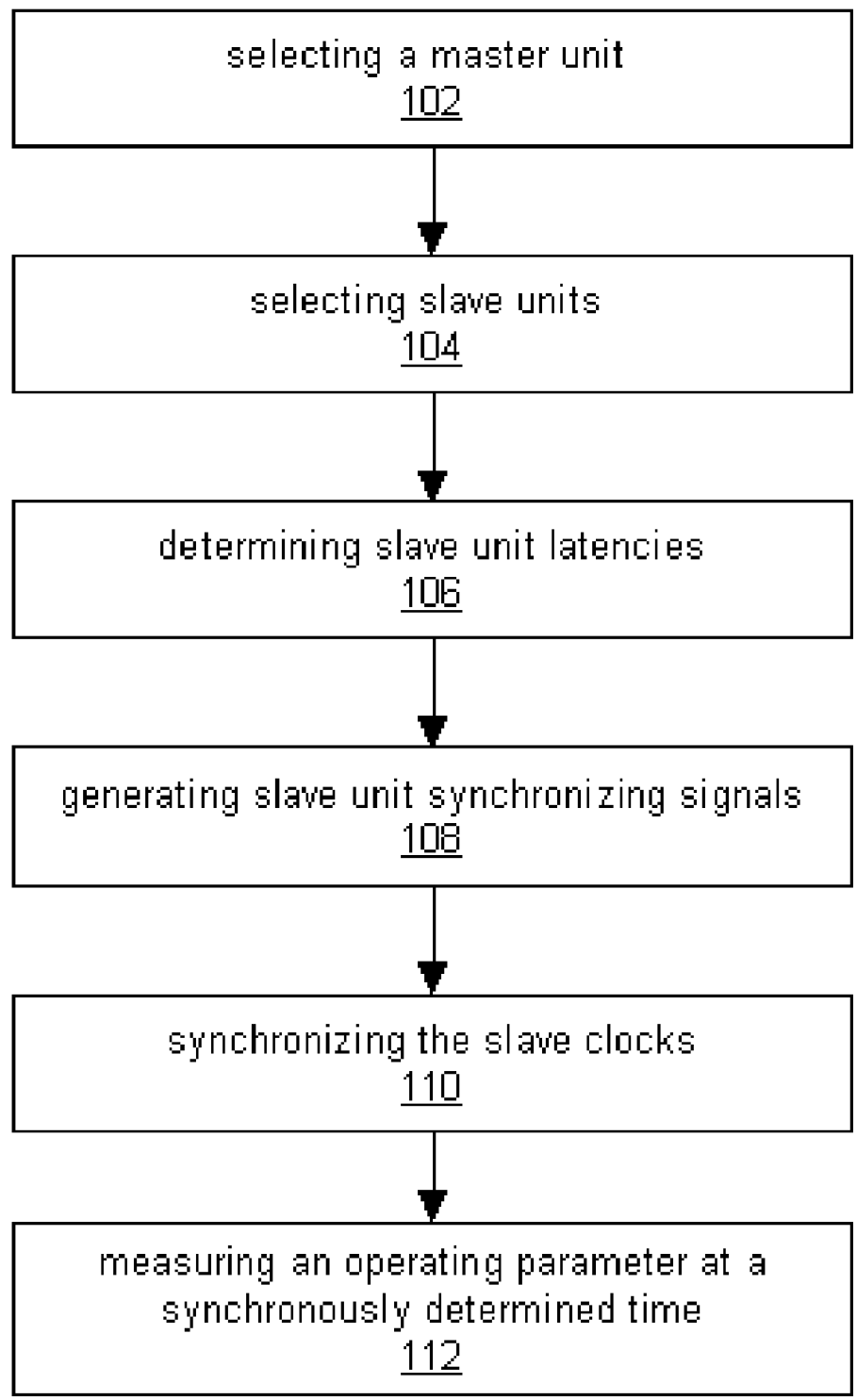
FIG. 3 is a flow chart of a method of parameter measurement for a distributed computer system performed in accordance with the present invention.

FIG. 3 is a flow chart of a method of parameter measurement for a distributed computer system performed in accordance with the present invention. The method 100 includes selecting a master unit 102; selecting slave units 104; determining slave unit latencies 106; generating slave unit synchronizing signals 108; synchronizing the slave clocks 110; and measuring an operating parameter at a synchronously determined time 112. The measured operating parameter from the slave units can be transmitted to the master unit for control or other uses as desired.

The method 100 accounts for slave unit latency, i.e., the time delay between sending a signal from the master unit until the slave unit receives the signal. The slave unit latency depends on the bus speed and the distance of the slave unit from the master unit. When the individual slave units are different distances from the master unit, the slave unit latency is different for each of the slave units. The method 100 accounts for slave unit latency to permit synchronous parameter measurement.

The selecting a master unit 102 includes selecting a master unit as part of a distributed computer system. As defined herein, a distributed computer system is a computer system in which the master unit is physically separate from one or more of the slave units. The selecting slave units 104 includes selecting slave units operably connected to the master unit on a bus. The slave units have slave clocks, and the slave clock in each slave unit can run independently of the slave clocks in the other slave units. In one example, the slave units are operably connected to the master unit over an I$^2$C (Intelligent Interface Controller) bus.

The determining slave unit latencies 106 includes determining slave unit latencies between the master unit and the slave units. A slave unit latency is determined for each of the slave units for which an operating parameter is to be measured. In one embodiment, the slave unit latencies are determined by calculation, e.g., the slave unit latency for a slave unit equals the distance from the master unit to the slave unit times the signal speed in the bus. In another embodiment, the slave unit latency is determined by experiment, e.g., the time is measured for a signal to pass from the master unit to a slave unit.

The generating slave unit synchronizing signals 108 includes generating slave unit synchronizing signals for the slave units, the slave unit synchronizing signals being adjusted for the slave unit latencies. A slave unit synchronizing signals is generated for each of the slave units for which an operating parameter is to be measured. The slave unit synchronizing signal for a particular slave unit can be a synchronization time to which all the slave units are to be set plus the slave unit latency for the particular slave unit. The synchronization time can match the master clock in the master unit, so that the master clock and the slave clocks have the same time. The synchronizing the slave clocks 110 includes synchronizing the slave clocks in response to the slave unit synchronizing signals. The slave clocks are synchronized for each of the slave units for which an operating parameter is to be measured. All the slave clocks are synchronized to the same time because the slave unit synchronizing signal includes the slave unit latency, accounting for the time for the slave unit synchronizing signal to pass from the master unit to the slave unit. The master unit can synchronize the slave units in order by sending the slave unit synchronizing signals in the order specified by a slave unit list.

The method 100 can conclude with the measuring an operating parameter at a synchronously determined time 112. The measurements are taken at all the slave units at the same time, i.e., the synchronously determined time, because the slave clocks for the slave units are synchronized. The measured operating parameter from the slave units can be transmitted to the master unit, where the measured operating parameters can be used as desired. One example of use is to pass the measured operating parameters to an external program. Another example of use is to change the power performance state of the distributed computer system, such as processor frequency, based on the measured operating parameters. Processor frequency can be increased when additional power is available and decreased when reduced power consumption is required.

The measuring an operating parameter at a synchronously determined time 112 includes measuring an operating parameter at the slave units at a synchronously determined time. In one embodiment, the operating parameter is power at the slave units. In another embodiment, the operating parameter is the temperature at the slave units. In yet another embodiment, the operating parameter is a mixture of operating parameters, with certain slave units measuring one parameter, such as power, and other slave units measuring one or more other operating parameters, such as temperature. The measuring of the operating parameter can be direct by using a sensor or indirect by measuring activity indicative of the operating parameter within the slave unit.

The measuring an operating parameter at a synchronously determined time 112 can also include measuring an operating parameter at a series of synchronously determined times. The series of synchronously determined times can be specific times, or a starting time and subsequent times separated by a measurement interval. In one embodiment, the measurement interval is selected so that several measurements can be taken during the measurement interval and the individual measurements averaged to provide the measured operating parameter.

The method 100 can also include re-synchronizing the slave clocks at a predetermined interval in response to the slave unit synchronizing signals. The timing crystals in the slave clocks of the slave units can drift, so that the synchronization of the slave clocks is lost unless the slave clocks are re-synchronized periodically. Those skilled in the art will appreciate that the length of the predetermined interval depends on the amount of drift of the timing crystals and the accuracy required for the measured operating parameter. In one example, a distributed computer system with a timing crystal drift of 100 μs per second can be re-synchronized at a predetermined interval of every 10 seconds to maintain the synchronization within 1 ms. In another example of a distributed computer system with two or more slave units, each having a timing crystal drift of 100 μs per second, the worst case system timing crystal drift would occur with the timing crystals of two slave units drifting in opposite directions from the master clock. The timing crystal of one slave unit could drift positive at 100 μs per second and the timing crystal of another slave unit could drift negative at 100 μs per second, resulting in a system timing crystal drift of 200 μs per second. To maintain the synchronization within 1 ms, the clocks can be synchronized at a predetermined interval of every 5 seconds.

In one example illustrating the problem of the clock drift, a distributed computer system includes 42 slave units: 16 dual core P6 processors with 32 voltage regulator modules (VRMs, one per core) and a combination of 10 memory DIMMs and I/O power units with 10 VRMs. The readings from all of the slave units need to be synchronized so that the control algorithms are valid. The time crystal in the slave clock of each slave unit has an accuracy of 100 parts per million, with an equivalent drift of 100 μs per second. Each slave unit is read every 64 ms to meet control loop requirements, so that about 16 readings are taken per second. Including a factor of two for the worst case positive and negative drift, the worst case drift per reading would be 12.8 μs (i.e., 64 ms*100 ppm*2). At 16 readings per second, the worst case drift per second would be 204.8 ms drift per second. Those skilled in the art will appreciate that slave clock re-synchronization at a predetermined interval can be used to correct the drift to assure control loop functionality.

Figure 4:
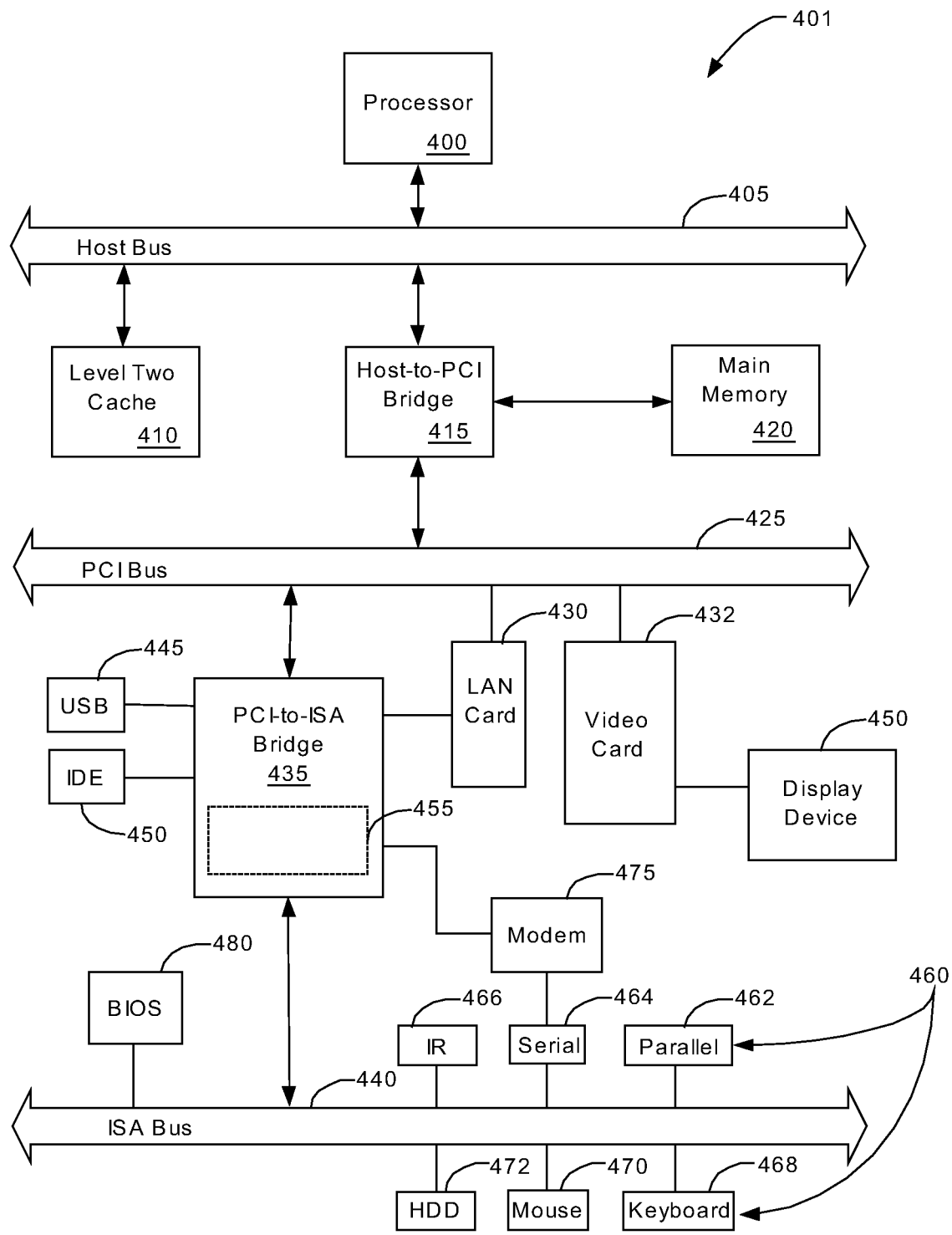
FIG. 4 is a block diagram of an information handling system for implementing parameter measurement for a distributed computer system in accordance with the present invention.

FIG. 4 is a block diagram of an information handling system for implementing parameter measurement for a distributed computer system in accordance with the present invention. The information handling system 401 is a simplified example of a computer system capable of performing the operations described herein. The information handling system 401 includes processor 400 which is coupled to host bus 505. A level two (L2) cache memory 410 is also coupled to the host bus 505. Host-to-PCI bridge 415 is coupled to main memory 420, includes cache memory and main memory control functions, and provides bus control to handle transfers among PCI bus 425, processor 400, L2 cache 410, main memory 420, and host bus 505. The PCI bus 425 provides an interface for a variety of devices including, for example, LAN card 430 and/or video card 432. The video card 432 is operably connected to a display device 490, such as a liquid crystal display (LCD), a cathode ray tube (CRT) display, a projection display, or the like. Those skilled in the art will appreciate that the video card 432 can be attached to other types of busses, such as an AGP or a PCI Express bus, as desired for a particular application.

PCI-to-ISA bridge 435 provides bus control to handle transfers between the PCI bus 425 and ISA bus 440, universal serial bus (USB) functionality 445, IDE device functionality 450, power management functionality 455, and can include other functional elements not shown, such as a real-time clock (RTC), DMA control, interrupt support, and system management bus support. Peripheral devices and input/output (I/O) devices can be attached to various interfaces 460 (e.g., parallel interface 462, serial interface 464, infrared (IR) interface 466, keyboard interface 468, mouse interface 470, and fixed disk (HDD) 472) coupled to ISA bus 440. Alternatively, a super I/O controller (not shown) can be attached to the ISA bus 440 to accommodate many 110 devices.

BIOS 480 is coupled to ISA bus 440, and incorporates the necessary processor executable code for a variety of low-level system functions and system boot functions. The BIOS 480 can be stored in any computer readable medium, including magnetic storage media, optical storage media, flash memory, random access memory, read only memory, and communications media conveying signals encoding the instructions (e.g., signals from a network). In order to attach information handling system 401 to another computer system to copy files over a network, LAN card 430 is coupled to PCI bus 425 and to PCI-to-ISA bridge 435. Similarly, to connect computer system 401 to an ISP to connect to the Internet using a telephone line connection, modem 475 is connected to serial port 464 and PCI-to-ISA Bridge 435.

While the computer system described in FIG. 4 is capable of executing the invention described herein, this computer system is simply one example of a computer system. Those skilled in the art will appreciate that many other computer system designs are capable of performing the invention described herein.

One of the preferred implementations of the invention is an application, namely, a set of instructions (program code) in a code module which may, for example, be resident in the random access memory of the computer. Until required by the computer, the set of instructions may be stored in another computer memory, for example, on a hard disk drive, or in removable storage such as an optical disk (for eventual use in a CD ROM) or floppy disk (for eventual use in a floppy disk drive), or downloaded via the Internet or other computer network. Thus, the present invention may be implemented as a computer program stored on a computer readable medium and executable by a digital processing apparatus to perform operations to display data. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps.

While the embodiments of the invention disclosed herein are presently considered to be preferred, various changes and modifications can be made without departing from the spirit and scope of the invention. The scope of the invention is indicated in the appended claims, and all changes that come within the meaning and range of equivalents are intended to be embraced therein.

We claim:

1. A method of parameter measurement for a distributed computer system, the method comprising:
   selecting a master unit;
   selecting slave units operably connected to the master unit on a bus, the slave units having slave clocks;
   determining slave unit latencies between the master unit and the slave units;
   generating slave unit synchronizing signals for the slave units, the slave unit synchronizing signals being adjusted for the slave unit latencies;
   synchronizing the slave clocks in response to the slave unit synchronizing signals;
   measuring an operating parameter at the slave units at a synchronously determined time, wherein the measuring comprises:
      taking a plurality of operating parameter measurements over a measurement interval; and
      averaging the plurality of operating parameter measurements to obtain a measured operating parameter;
   transmitting the measured operating parameter from the slave units to the master unit; and
   controlling power at the slave units in response to the measured operating parameter.

2. The method of claim 1 wherein the measured operating parameter is measured power.

3. The method of claim 1 further comprising re-synchronizing the slave clocks at a predetermined interval in response to the slave unit synchronizing signals.

4. The method of claim 1 wherein the determining slave unit latencies between the master unit and the slave units comprises determining slave unit latencies by a technique selected from the group consisting of calculation and experiment.

5. The method of claim 1 wherein the master unit is a symmetric multiprocessing (SMP) server and the slave units are selected from the group consisting of processor cores, memory units, and input/output systems.

6. The method of claim 1 wherein the bus is an $I^2C$ (Intelligent Interface Controller) bus.

7. The method of claim 1 wherein the measured operating parameter is measured temperature.

8. A computer program product in a computer readable medium for parameter measurement for a distributed computer system, the distributed computer system comprising a master unit and slave units operably connected to the master unit on a bus, with the slave units having slave clocks, the computer program product comprising:
   computer program code for determining slave unit latencies between the master unit and the slave units;
   computer program code for generating slave unit synchronizing signals for the slave units, the slave unit synchronizing signals being adjusted for the slave unit latencies;
   computer program code for synchronizing the slave clocks in response to the slave unit synchronizing signals;
   computer program code for measuring an operating parameter at the slave units at a synchronously determined time, wherein the computer program code for measuring comprises:
      computer program code for taking a plurality of operating parameter measurements over a measurement interval; and
      computer program code for averaging the plurality of operating parameter measurements to obtain a measured operating parameter;
   computer program code for transmitting the measured operating parameter from the slave units to the master unit; and
   computer program code for controlling power at the slave units in response to the measured operating parameter.

9. The product of claim 8 wherein the measured operating parameter is measured power.

10. The product of claim 8 further comprising computer program code for re-synchronizing the slave clocks at a predetermined interval in response to the slave unit synchronizing signals.

11. An information handling system comprising:
   a processor;
   a master unit;
   slave units operably connected to the master unit on a bus, the slave units having slave clocks;
   a memory coupled to said processor to store instructions executable by a digital processing apparatus to perform operations to provide parameter measurement for a distributed computer system, the operations comprising:
   determining slave unit latencies between the master unit and the slave units;
   generating slave unit synchronizing signals for the slave units, the slave unit synchronizing signals being adjusted for the slave unit latencies;
   synchronizing the slave clocks in response to the slave unit synchronizing signals;
   measuring an operating parameter at the slave units at a synchronously determined time, wherein the measuring comprises:
      taking a plurality of operating parameter measurements over a measurement interval; and averaging the plurality of operating parameter measurements to obtain a measured operating parameter;

transmitting the measured operating parameter from the slave units to the master unit; and controlling power at the slave units in response to the measured operating parameter.

12. The system of claim 11 wherein the measured operating parameter is measured power.

13. The system of claim 11, the operations further comprising re-synchronizing the slave clocks at a predetermined interval in response to the slave unit synchronizing signals.

14. A method of power measurement for a distributed computer system, the method comprising:

selecting a master unit;

selecting slave units operably connected to the master unit on a bus, the slave units having slave clocks;

determining slave unit latencies between the master unit and the slave units;

determining slave unit synchronizing signals for the slave units, the slave unit synchronizing signals being adjusted for the slave unit latencies;

synchronizing the slave clocks in response to the slave unit synchronizing signals;

measuring power at the slave units at a synchronously determined time, wherein the measuring comprises:

taking a plurality of power measurements over a measurement interval; and averaging the plurality of power measurements to obtain a measured power parameter;

transmitting the measured power parameter from the slave units to the master unit; and controlling power at the slave units in response to the measured power parameter.

* * * * *